US011602912B2

(12) United States Patent
Barjon et al.

(10) Patent No.: US 11,602,912 B2
(45) Date of Patent: Mar. 14, 2023

(54) METHOD FOR PLACING A REINFORCING PLY ON A LARGE DIMENSION DRUM

(71) Applicant: Compagnie Generale Des Etablissements Michelin, Clermont-Ferrand (FR)

(72) Inventors: Stéphane Barjon, Clermont-Ferrand (FR); Michel Gayton, Clermont-Ferrand (FR)

(73) Assignee: Compagnie Generale des Etablissements Michelin, Clermont-Ferrand (FR)

(*) Notice: Subject to any disclaimer, the term of this patent is extended or adjusted under 35 U.S.C. 154(b) by 266 days.

(21) Appl. No.: 16/955,158

(22) PCT Filed: Dec. 12, 2018

(86) PCT No.: PCT/EP2018/084600
§ 371 (c)(1),
(2) Date: Jun. 18, 2020

(87) PCT Pub. No.: WO2019/121254
PCT Pub. Date: Jun. 27, 2019

(65) Prior Publication Data
US 2020/0391464 A1    Dec. 17, 2020

(30) Foreign Application Priority Data
Dec. 19, 2017 (FR) ...................................... 17/62403

(51) Int. Cl.
B29D 30/46        (2006.01)
B29D 30/30        (2006.01)

(52) U.S. Cl.
CPC .......... B29D 30/46 (2013.01); B29D 30/3007 (2013.01); *B29D 2030/466* (2013.01)

(58) Field of Classification Search
CPC ....................... B29D 30/1607; B29D 30/3007; B29D 30/38; B29D 30/46; B29D 30/70;
(Continued)

(56) References Cited

U.S. PATENT DOCUMENTS 3,319,500 A * 5/1967 Siegenthaler .......... B29D 30/46
83/556

FOREIGN PATENT DOCUMENTS

DE    1144912 B    7/1963
EP    0125882 A2   11/1984
(Continued)

*Primary Examiner* — Geoffrey L Knable
(74) *Attorney, Agent, or Firm* — Dickinson Wright PLLC; Steven C. Hurles

(57) ABSTRACT

The method comprises steps during which, by making the cylindrical form rotate in a first circumferential direction, the ply is deposited until the front edge and performs a complete rotation. A point of penetration is marked on the ply on a cutting line, and a cutting blade that is driven in translation is made to penetrate between two wires placed on the cutting line at the point of penetration. The cylindrical form is made to rotate in an opposite second circumferential direction while displacing the cutting blade in a first transverse direction until the cutting blade is disposed at a predetermined and non-zero distance from a first selvedge. Without retracting the cutting blade from the wire gap, the cylindrical form is made to rotate in the first circumferential direction while displacing the cutting blade in an opposite second transverse direction until the cutting blade emerges at a second selvedge.

18 Claims, 6 Drawing Sheets

(58) Field of Classification Search
CPC .... B29D 2030/1678; B29D 2030/3078; B29D 2030/4456; B29D 2030/466
See application file for complete search history.

(56) References Cited

FOREIGN PATENT DOCUMENTS

| | | | |
|---|---|---|---|
| EP | 0537348 | A1 | 4/1993 |
| JP | 3134181 | B2 * | 2/2001 |
| JP | 4162887 | B2 * | 10/2008 |
| JP | 2017217739 | A | 12/2017 |
| JP | 2018-024027 | A * | 2/2018 |
| NL | 1025764 | C2 | 9/2005 |
| WO | 2012139556 | A1 | 10/2012 |

* cited by examiner

METHOD FOR PLACING A REINFORCING PLY ON A LARGE DIMENSION DRUM

CROSS-REFERENCE TO RELATED APPLICATION

The present application claims priority to PCT International Patent Application Serial No. PCT/EP2018/084600, filed Dec. 12, 2018, entitled "METHOD FOR PLACING A REINFORCING PLY ON A LARGE DIMENSION DRUM" and to French Patent Application Serial No. 17/62403, filed Dec. 19, 2017, entitled "PROCÉDÉ DE POSE D'UNE NAPPE DE RENFORT SUR UN TAMBOUR DE GRANDE DIMENSION".

BACKGROUND OF THE INVENTION

1. Field of the Invention

The subject disclosure relates to a method for producing a tire comprising a step during which a reinforcing ply is deposited by winding on a cylindrical form.

This method addresses the case of tires of large dimension such as civil engineering tires, whose seat diameter can range up to 63 inches and whose weight can be as high as several tons.

2. Related Art

The production of these tires requires the implementation of rubber components suited to the development of these tires and whose weight greatly exceeds the current handling capabilities of the operators in charge of these operations. Also, insofar as possible, it involves means capable of relieving these handling efforts.

The method according to the present disclosure relates more particularly to the laying of the reinforcing plies intended to consolidate the crown of the tire. These plies are formed by wire sections coated in a rubber mixture, parallel to one another and forming a given angle with the longitudinal direction of the ply. These wires are, as a general rule, metal wires which are themselves formed by the assembly of several layers of wires wound on themselves.

The reinforcing plies are taken from a continuous band and are laid on a receiving surface such as a substantially cylindrical form formed by radially mobile segments or directly on the crown of the envelope after a so-called conformation step during which the tire blank is given its toroidal form.

It has however been found that, in these two cases, it is very difficult to control the diameter, and therefore the circumference of the surface receiving the reinforcing ply. It is therefore impossible to make a length cut of the ply upstream of the crown assembly device.

SUMMARY OF THE INVENTION

The object of the method according to the present disclosure, using suitable device elements, is to provide a solution to the problems posed above.

This method provides for implementing the following steps, during which:

Step A: a front edge of the reinforcing ply is made to adhere on the cylindrical form and, by making the cylindrical form rotate in a first circumferential direction, the ply is deposited on the cylindrical form until the front edge performs a complete revolution, Step B: a point of penetration on a cutting line is marked on the ply to form a rear edge intended to be joined with the front edge, Step C: a cutting blade with which a cutting head driven in translation along a transverse axis is equipped, is made to penetrate between two wires placed on the cutting line at said point of penetration and defining a wire gap, Step D: the cylindrical form is made to rotate in a second circumferential direction, opposite the first circumferential direction, while displacing the cutting head in a first transverse direction until the cutting blade is disposed at a predetermined and non-zero distance from a second selvedge and, without retracting the cutting blade from the wire gap, Step E: the cylindrical form is made to rotate in the first circumferential direction, while displacing the cutting head in a second transverse direction, opposite the first transverse direction, until the cutting blade emerges at a first selvedge, Step F: the cylindrical form is made to rotate in the second circumferential direction and the rear edge is made to adhere on the cylindrical form by abutting the rear edge and the front edge, Step G: the rear edge of the ply is detached at the second selvedge and the joining of the rear edge and of the front edge is completed.

The result of this procedure is that the cutting of the ply to free the rear edge before its joining with the front edge is done directly on the cylindrical form. The adjustment of the length of the ply, such that the front edge and the rear edge can join, results then from the accuracy with which the position of the point of penetration is determined.

It is also found that the length cutting of the ply can be done without it being necessary to extract the cutting blade from the wire gap defined by the space lying between the two wires forming the selvedges at the rear edge of the ply during the laying and the front edge of the rest of the continuous band. This feature of the method makes it possible to dispense with the need to reinsert the blade between the two wires and which is difficult to perform using automated means. It also allows the possibility, as will be seen hereinbelow, of performing most of the cutting operations using motorized means that can be controlled by a centralized control unit making it possible to relieve and reduce to the necessary minimum the manual interventions of the operator.

In particular, this method makes it possible to perform cuts along selvedges of a great length of up to 5 m. It finally makes it possible to reduce the efforts imposed on the operator to unstick the ply and adjust the joining of the front selvedge and of the rear selvedge.

The method according to the present disclosure can also comprise, in isolation or in combination, the execution of the following actions:

During the step B, an operator determines the point of penetration and adds a visible mark at that point.

During the step C, using a camera disposed on the cutting head, the mark disposed on the point of penetration is detected, and the rotation of the cylindrical form and the transverse displacement of the cutting head are controlled to bring said cutting blade in line with said point of penetration.

During the step B, the front edge is detected using an edge detection device that is sensitive to the height variation caused on the cylindrical form by the passage of said front edge in line with said edge detection device, and the cylindrical form and the cutting blade are brought to predetermined angular and transverse positions so that, during the step C, the cutting blade penetrates between two wires at the point of penetration situated on the cutting line.

The transverse position of the cutting blade is aligned with the position of the edge detection device.

The edge detection device is disposed transversely equidistant from the first selvedge and from the second selvedge.

During the steps D and E, the transverse displacement of the cutting head is regulated as a function of the longitudinal displacement of the laying mat and of the angle formed by the wires with the longitudinal direction.

The cutting blade is freely mobile in a transverse direction relative to the cutting head.

Using a means for evaluating the transverse position of the cutting blade relative to the cutting head, the transverse displacement of the cutting head is adjusted so that the transverse position of the cutting blade relative to the cutting head remains within predetermined limits.

During steps A, D, E and F, the ply is made to circulate in succession on a centring mat then on a laying mat disposed upstream of the cylindrical form.

The centring mat is rotationally mobile about an axis at right angles to the plane of the centring mat on which the ply circulates and, using cameras detecting the position of the selvedges of the ply, the angular position of the centring mat is regulated so as to align the ply with a predefined transverse position.

The wires of the ply are metal wires, and the centring mat and the laying mat are provided with a magnetic device to make the ply adhere on said mats.

The planes of the laying mat and of the centring mat on which the ply circulates form between them a non-zero angle.

A motive force imparted on the ply by the centring mat is less than or equal to half a motive force imparted on the ply by the laying mat.

The longitudinal speed of the laying mat and of the centring mat, relative to the speed of rotation of the cylindrical form, is adjusted so that the tension of laying of the ply on the cylindrical form is equal to a predetermined value.

In the step G, the rear edge of the ply is detached using manual tools.

The cylindrical form is formed by radially mobile segments.

The cylindrical form is the crown of a toroidal tire blank.

BRIEF DESCRIPTION OF THE DRAWINGS

The present disclosure will be better understood on reading the following description and the attached figures, which are given by way of example and are in no way limiting, and in which.

DETAILED DESCRIPTION OF THE EXEMPLARY EMBODIMENT

In the following, the reference frames will be used in which the longitudinal direction XX' corresponds to the direction of circulation of the ply and to the circumferential laying direction. The direction YY' corresponds to the transverse direction of the ply and to the axial direction of the cylindrical form. Finally, the direction ZZ' corresponds to a direction at right angles to the plane of the ply coinciding, when the ply is wound on the cylindrical form, with the radial direction of said cylindrical form.

Figure 1:
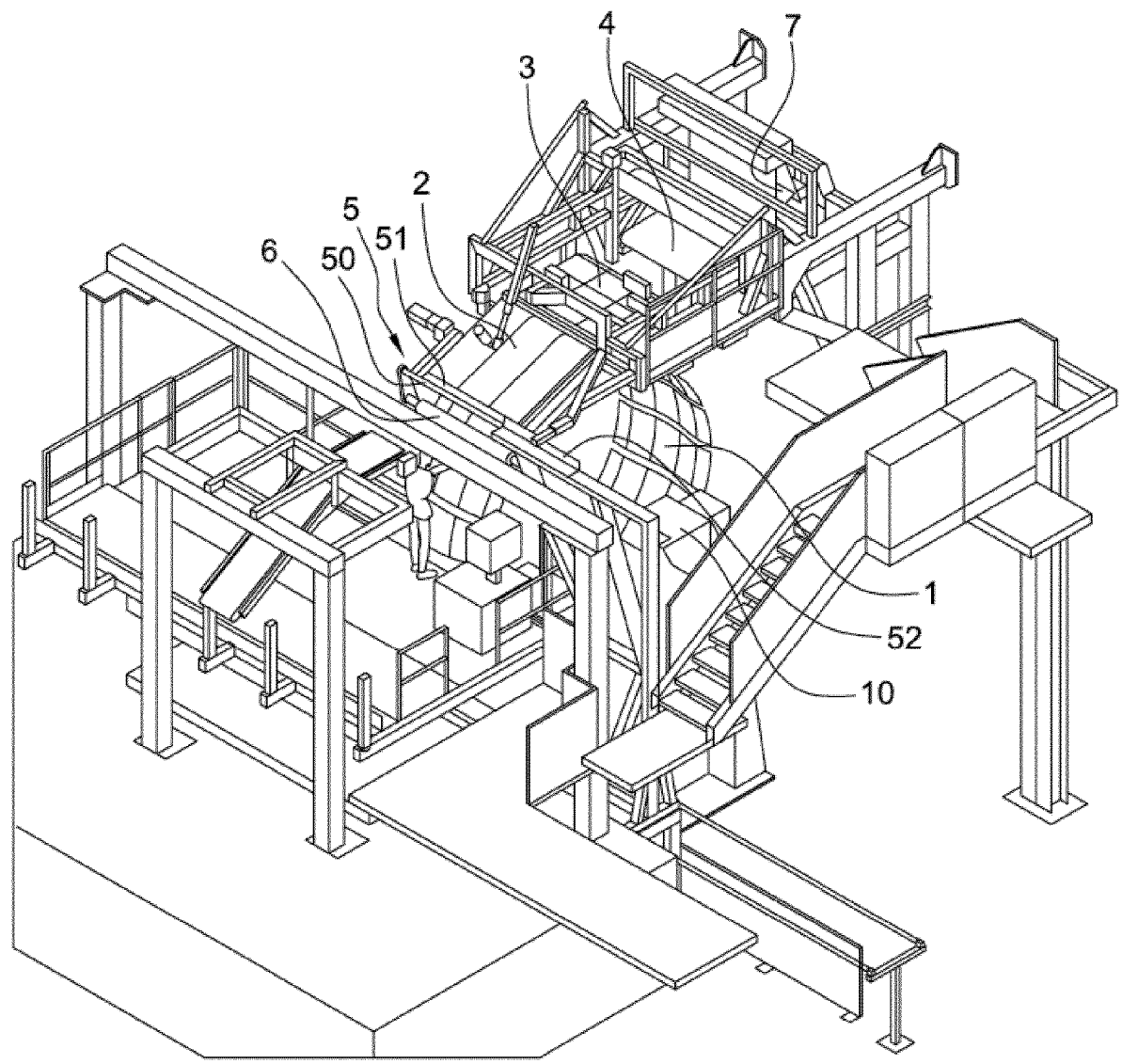
FIG. 1 represents a perspective schematic view of an assembly machine for producing the crown of a civil engineering tire.

The production machine illustrated in FIG. 1 makes it possible to locate the main members useful to the implementation of the method.

The cylindrical form 1, formed by segments which are distributed circumferentially and radially mobile, is made to rotate about its axis by a motor 10. A coder (not represented) makes it possible to know at all times the angular position of the cylindrical form and the speed of rotation of the cylindrical form 1.

A motorized unwinder 7 is disposed upstream of the installation to apply on demand the length of band necessary to take a reinforcing ply P intended to form the crown of the tire envelope.

A first supply mat 4 directs the band downstream of the machine. This supply mat 4 can be a motorized drive mat or even a ball table allowing a lateral displacement of the band. Mechanical pre-centring means, such as adjustable guides, then make it possible to laterally place the band within a first set of tolerances.

A centring mat 3 is disposed downstream of the supply mat 4, and upstream of a laying mat 2. Preferentially, the centring mat 3 and the laying mat 4 are provided with a magnetic system, that is known per se, making it possible to make the ply adhere and to hold it in position throughout the process of transfer of the ply on the mats 2 and 3.

Optionally, transfer arms or magnetic mats can be placed between the mats to ensure the passage of the point of the ply from mat to another.

The unwinding or winding device 7, the supply mat 4, the centring mat 3 and the laying mat 2 are controlled by a centralized control unit which actuates the mat drive means to move the ply forward or backward at a longitudinal speed synchronized with the angular speed of the cylindrical form 1.

When the cylindrical form 1 is rotated in the first direction, the laying mat 2, the centring mat 3, the supply mat 4 and the unwinding device 7 are actuated in a first longitudinal direction corresponding to the unwinding and to the supplying of a continuous band. When the cylindrical form 1 is rotated in the second circumferential direction, these members operate in a second longitudinal direction opposite the first longitudinal direction and the device 7 is then configured to rewind the band.

A cutting device 5, also controlled by the centralized control unit, is disposed downstream of the laying mat 2, between a tension regulation roller 6 and the output of the laying mat. The cutting device 5 comprises a cutting head 51 circulating on a transversely disposed rail 50. A reflector 52 is placed behind the ply.

The tension regulation roller 6 is disposed downstream of the cutting device 5 in proximity to the point of contact between the ply and the cylindrical form 1.

Figure 2:
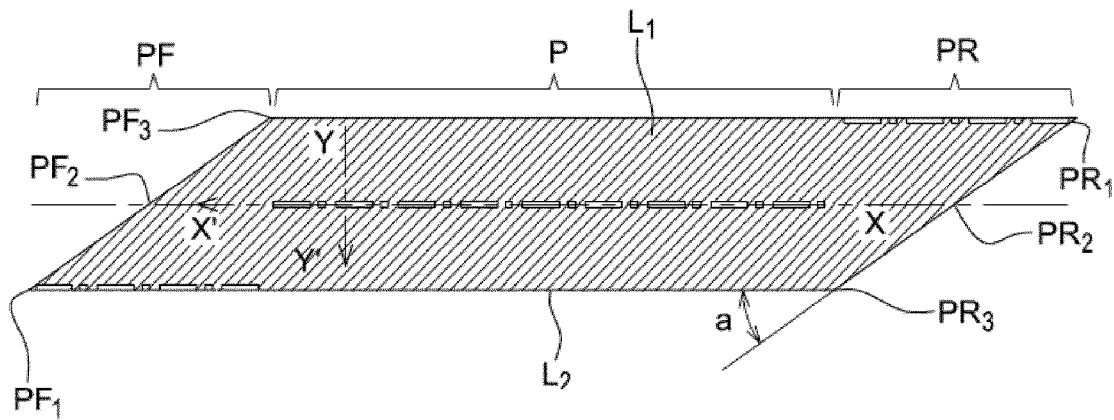
FIG. 2 represents a schematic plan view of a reinforcing ply.

FIG. 2 represents a reinforcing ply P, once detached from the continuous band, in which a first selvedge $L_1$ and a second selvedge $L_2$ are distinguished. These lateral selvedges are parallel to one another and are at a distance from one another, in the case of a ply intended for a civil engineering tire, of a width varying from 150 millimetres to more than a metre.

The reinforcing ply has a thickness that can vary from 3 mm to 10 mm. The wires that make up the reinforcing ply have a diameter ranging from 1 mm to 6 mm and the pitch between the wires varies, depending on the type of ply, from 2 mm to 7 mm.

The front edge PF comprises a front point $PF_1$, a front heel $PF_3$ and a front centre $PF_2$ situated on the intersection of the line equidistant from the two selvedges $L_1$ and $L_2$ with the line forming the front edge. Likewise, the rear edge PR comprises a rear point $PR_1$, a rear heel $PR_3$ and a rear centre $PR_2$.

The wires of the ply form a given angle a with the longitudinal direction XX' lying between 0° and 60°.

The width and angle values indicated above result in a ply edge being obtained with a length varying from 300 mm to more than 5 m.

These number data also make it possible to better assess the lengths and the weights involved, and the benefit of facilitating the cutting and the laying of the ply.

Figure 3:
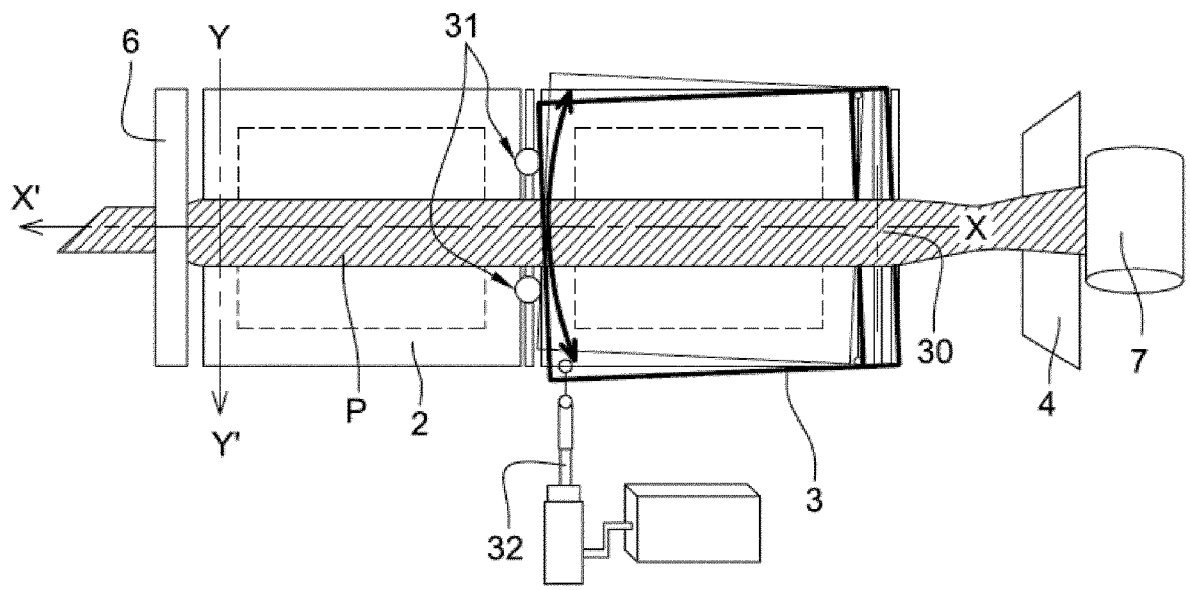
FIG. 3 represents a schematic plan view of the centring and laying device.

FIG. 3 illustrates the operation of the dynamic centring device. The centring mat 3 represented in FIG. 3 is mounted to rotate about an axis 30 at right angles to the plane of the centring mat 3. An actuation cylinder 32 makes it possible to control the angular position of the centring mat relative to the longitudinal direction XX'. Cameras 31, disposed on either side of the ply between the centring mat 3 and the laying mat 2, detect the position of the selvedges $L_1$ and $L_2$ relative to a centring axis. This centring axis can be aligned on an equatorial line of the cylindrical form or offset laterally depending on the type of ply to be laid.

The information concerning the positioning of the selvedges obtained by the cameras 31 is transmitted to the centralized control unit, which controls the position of cylinder 32, to modify the lateral position of the ply so that the ply enters onto the laying mat 2 by being perfectly aligned with the centring axis.

When only the front edge or the rear edge of the ply rests on the centring mat, a choice will be made to align the ply relative to just the position of the selvedge forming the lateral part of said edge.

Figure 4:
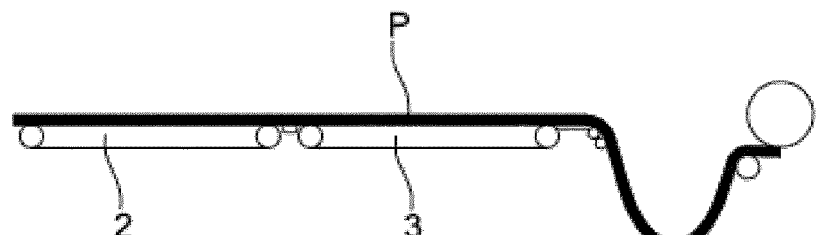
FIGS. 4, 5 and 6 represent simplified schematic profile views of the laying mat and of the centring mat during the implementation of the method.
Figure 5:
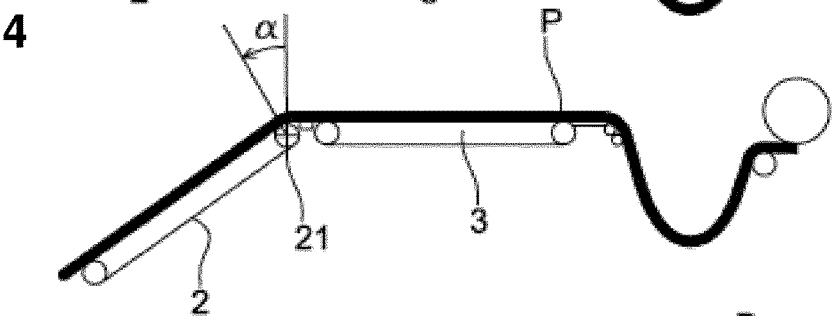
Figure 6:
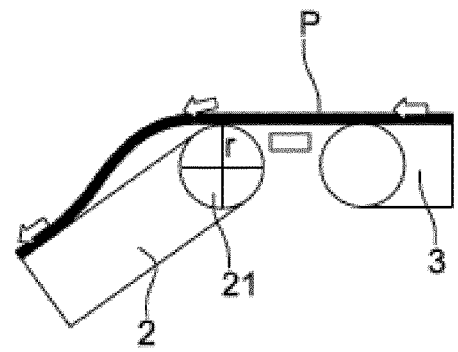

FIGS. 4, 5 and 6 illustrate a particular feature of the implementation of the unwinding method linked to the great thickness of the ply.

When the centring mat 3 and laying mat 2 are disposed on a single plane, the neutral fibre of the ply circulates at the same speed as the face of the ply P in contact with the surface of the mats, as is illustrated in FIG. 4.

When, at the time of the laying of the ply, the laying mat 2 is lowered towards the cylindrical form 1, the plane of the laying mat 2 forms a non-zero angle a with the plane of the centring mat 3. The ply then circulates on the cylindrical part of the drive roller 21 disposed on the upstream side of the laying mat.

The result of these respective positionings is that, at said cylindrical part, the circumferential speed of the ply depends on the distance to the centre of rotation of the roller 21. The part of the ply in contact with the cylindrical part will have a circumferential displacement speed equal to the product of the angular speed of the roller 21 and the radius r. On the other hand, the circumferential speed of the neutral fibre of the ply will be equal to the product of the angular speed of the roller 21 and the radius r increased by the half-thickness of the ply P. When the ply is very thick, the formation of a detachment of the ply on entering the laying mat is observed, as is illustrated in FIG. 6.

To reduce this inconvenient phenomenon, it is proposed to create a slight slip between the two mats, by increasing the motive force of the laying mat 2 relative to the motive force of the centring mat 3. In practice, the motive force imparted by the centring mat 3 is adjusted to advance the ply in such a way that it is less than or equal to half the motive force to advance the ply imparted by the laying mat 2.

Figure 7:
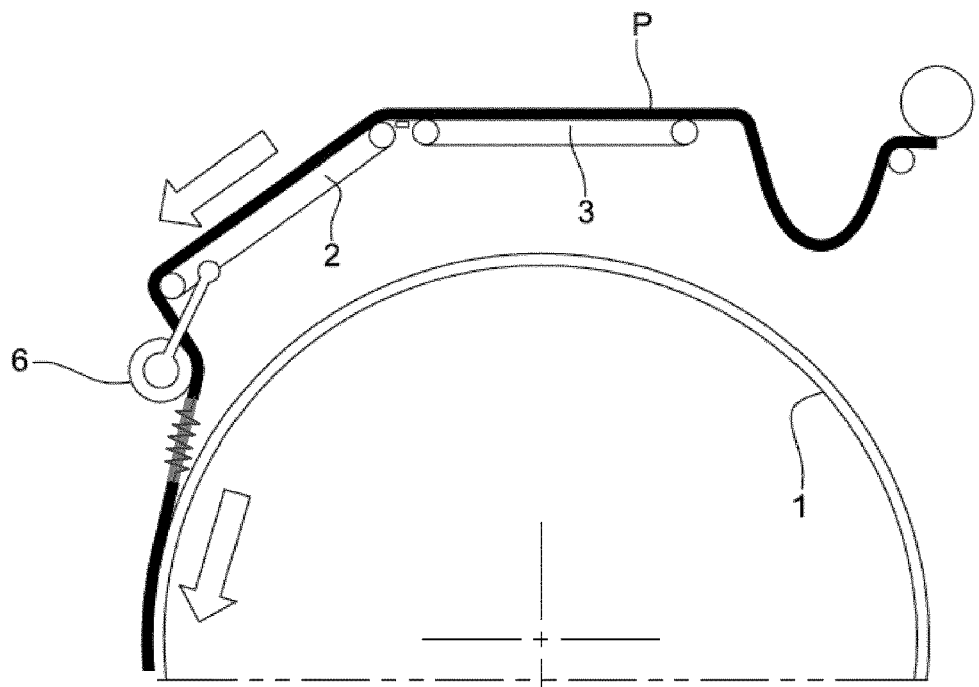
FIG. 7 represents a schematic profile view of the tension regulation device.

FIG. 7 illustrates the operation of the tension regulation device comprising a dynamometric roller 6 around which the reinforcing ply circulates when the laying mat 2 is in the low position. After calibration, the radial force exerted by the ply on the roller 6 makes it possible to estimate the laying tension.

A regulation device, linked to the centralized control unit, then acts on the speed of the mats 2, 3 and 4 to keep the laying tension at a predetermined value.

A first "blind" regulation loop makes it possible to synchronize the speed of the mats with the angular speed of the cylindrical form. However, as is described above, the tangential speed at the point of contact between the ply and the surface of the cylindrical form can know substantial variations linked to the absence of control over the diameter of the cylindrical form, and to the presence of the previously laid profiled elements.

The regulation of the tension around a setpoint value that can vary between 100 N and 300 N is overlaid on the first regulation loop and makes it possible to dispense with these uncertainties. The tension regulation device can be activated regardless of the circumferential direction imposed on the cylindrical form 1.

Figure 8:
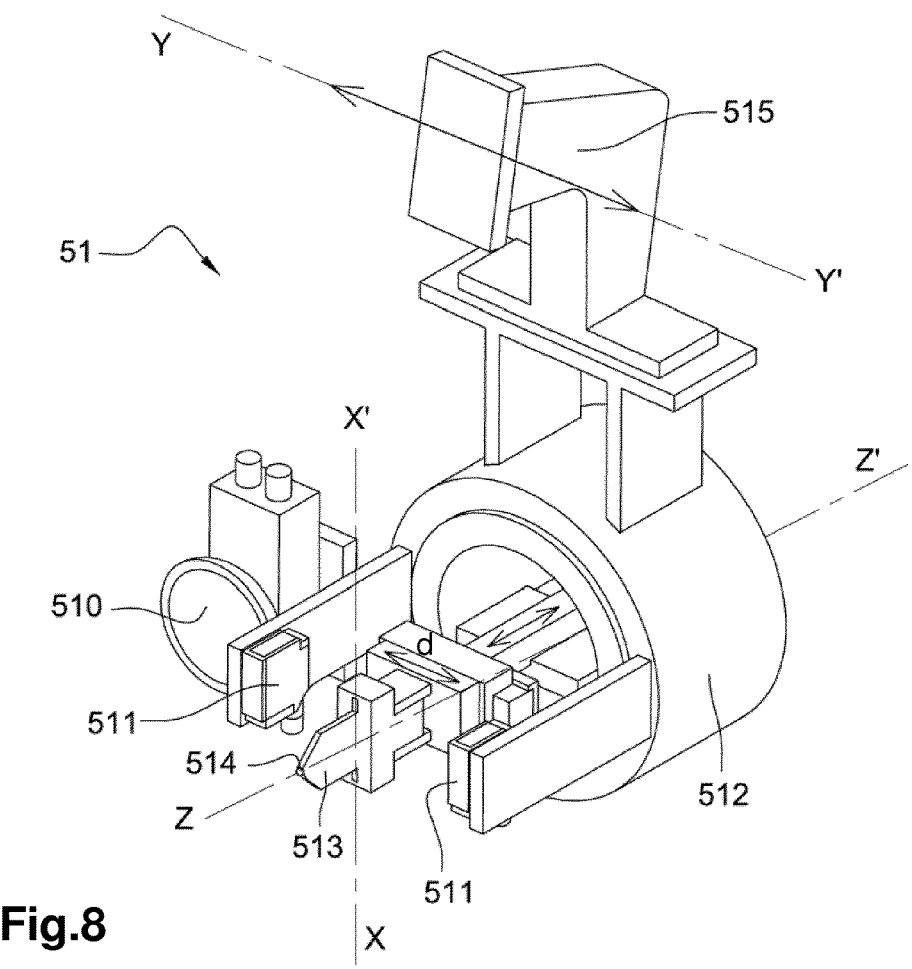
FIG. 8 represents a schematic perspective view of the cutting head.
Figure 9:
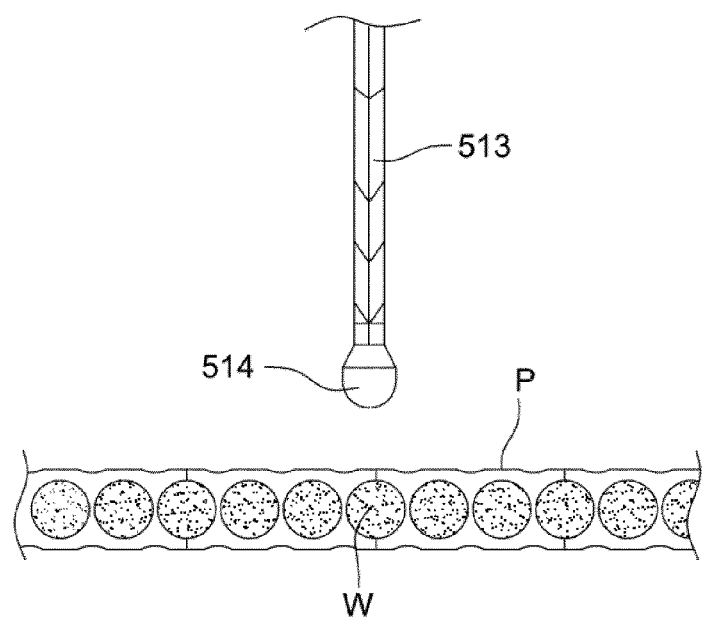
FIG. 9 represents a schematic front view of the point of the cutting blade.

FIGS. 8 and 9 show in more detail the cutting head 51 mounted via a support arm 515 on a carriage (not visible) sliding on the transverse rail 50. The cutting of the ply is performed by displacing the ply in the longitudinal direction XX' and by displacing the carriage supporting the cutting head 51 in the transverse direction YY'. The ratio of the transverse displacement of the cutting head 51 and of the longitudinal displacement of the ply P is equal to the tangent of the angle formed by the wires of the ply with the longitudinal direction.

The cutting head 51 comprises a body 512 supporting a cutting blade 513. A motorized device (not visible) makes it possible to actuate the cutting blade in the direction ZZ' to make the blade penetrate into the wire gap formed by the cutting line L.

To facilitate the introduction of the cutting blade 513 and avoid damaging the reinforcing wires W during the penetration along the axis ZZ' of the blade into the ply, the point of the blade 513 is provided with a spherical element 514 making it possible to guide the blade between two reinforcing wires W, as is illustrated in FIG. 9. The diameter of the spherical element is usefully of the order of 4 mm. A heating device makes it possible to keep the cutting blade 513 at a regulated temperature of the order of 60° C.

An anvil (not represented) can be brought up to the back of the ply in line with the point of penetration of the cutting blade, to facilitate the penetration of the blade into the ply.

The angular position of the cutting blade 513 about the axis ZZ' can also be adjusted to correspond substantially to the angle formed by the wires of the ply P with the longitudinal direction.

The cutting blade 514 comprises two sharp cutting wires opposite one another so as to allow the cutting of the ply regardless of the direction of circulation of the cutting blade in the wire gap.

Finally, the cutting blade 513 is free to be displaced in the transverse direction YY' relative to the body 512. This displacement takes place between two limits separated by a value d. A sensor 516 such as a laser makes it possible to evaluate the lateral position of the blade within this travel whose value is of the order of a centimetre. It is in fact found that the angle formed by the wires along the cutting line is not strictly constant and that the blade can be offset laterally in one direction or in another. A weakly calibrated return spring (not visible) makes it possible to return the blade to the zero point when the blade is retracted from the wire gap.

When the transverse deviation imposed by the wires exceeds the free travel value, the sensor 516 sends a signal to the centralized control unit which controls the displacement of the carriage circulating on the rail 50 and supporting the cutting head to replace the blade within the limits within which the travel remains free.

Cells 511 placed both sides of the body 512 of the cutting head make it possible to evaluate the position of the blade relative to the first selvedge $L_1$ or to the second selvedge $L_2$. The light reflected by the reflector 52 is detected by the cells 511, and a signal is sent to the centralized control unit.

A camera 510 placed on the body 512, also linked to the centralized control unit, makes it possible to detect, as will be seen hereinbelow, the position of a particular mark M made on the surface of the ply.

After having described the device elements necessary to the implementation of the present disclosure, the following sets out to describe the main steps of the method forming the object per se of the present disclosure.

During a first step A, the band is unwound to offer up the front edge to the cylindrical form 1. The operator makes the point of the front edge PF adhere to the cylindrical form 1 and launches the rotation of the cylindrical form in a first circumferential direction to deposit the ply on the cylindrical form until the front edge PF substantially performs a complete revolution.

During this step, as seen above, the guiding and centring means make it possible to position the ply accurately while ensuring a regular laying tension.

The next step B begins when the front edge PF is once again in front of the operator. During this step B, a point of penetration on a cutting line L is marked on the ply to form a rear edge PR intended to be joined with the front edge PF.

Figure 10:
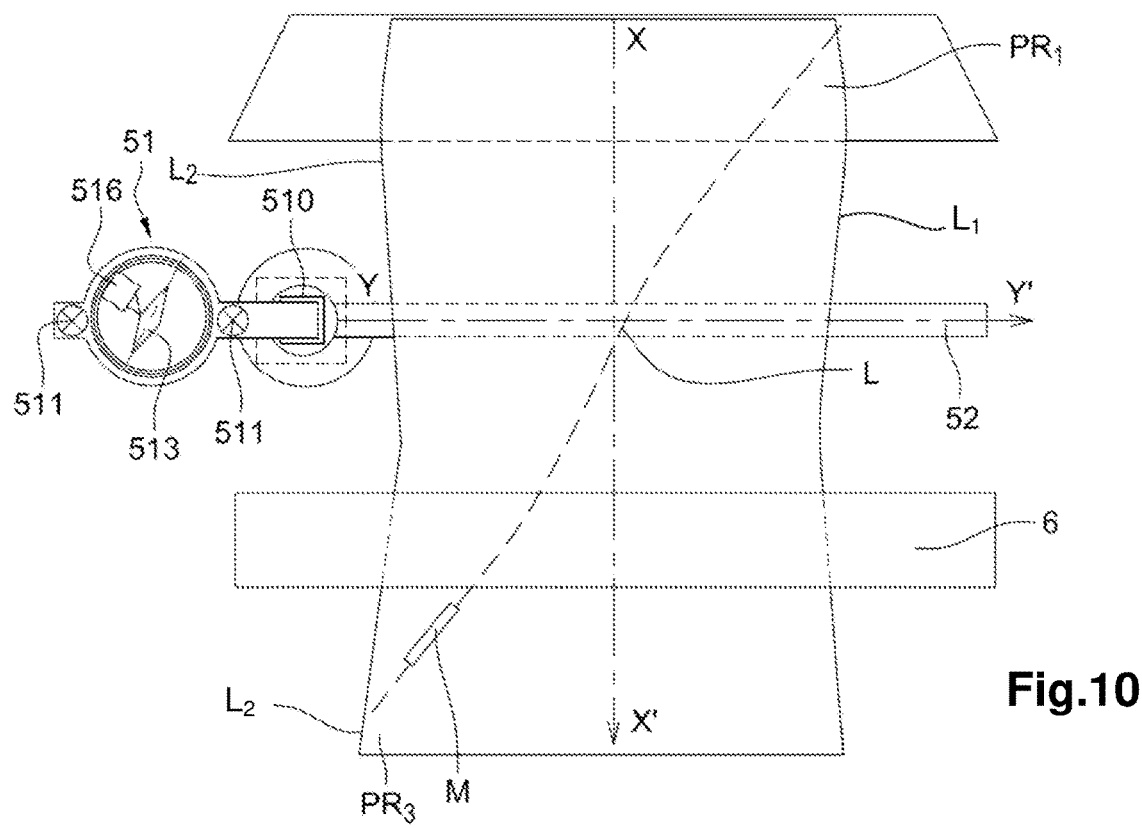
FIG. 10 represents a schematic front view of the ply during the step B.
Figure 11:
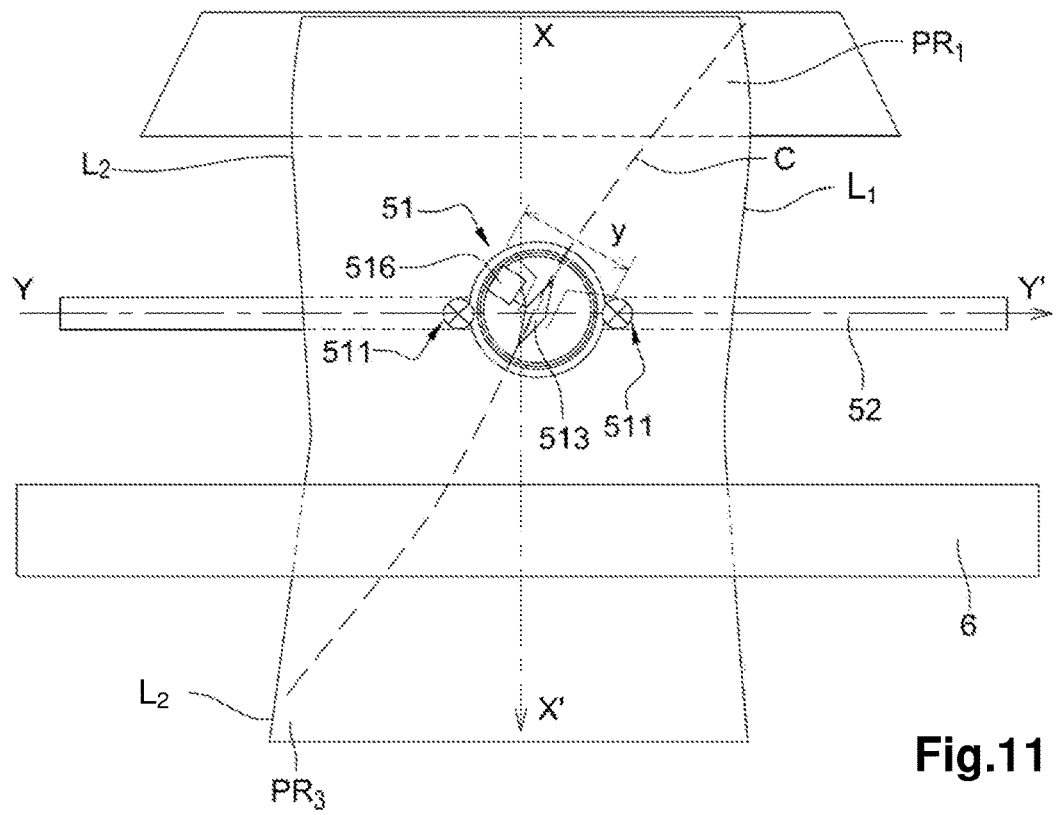
FIG. 11 represents a schematic front view of the ply during the step D or the step E.

A first alternative consists in allowing the operator to estimate the position of the cutting line L. Once the cutting line is located, the operator makes a visible mark M on the point of penetration where he or she wants to make the cutting blade penetrate into the band, as is illustrated in FIG. 10. As a general rule, the operator manages to position the mark M as close as possible to the selvedge $L_2$ situated on the side of the ply intended to form the heel of the rear edge $PR_3$.

The camera 510 is then activated and the centralized control unit controls the positioning of the cutting head 51 and the forward or backward moving of the ply for the cutting blade 513 to be positioned immediately in line with the mark M. The cylindrical form is then immobilized.

Figure 12:
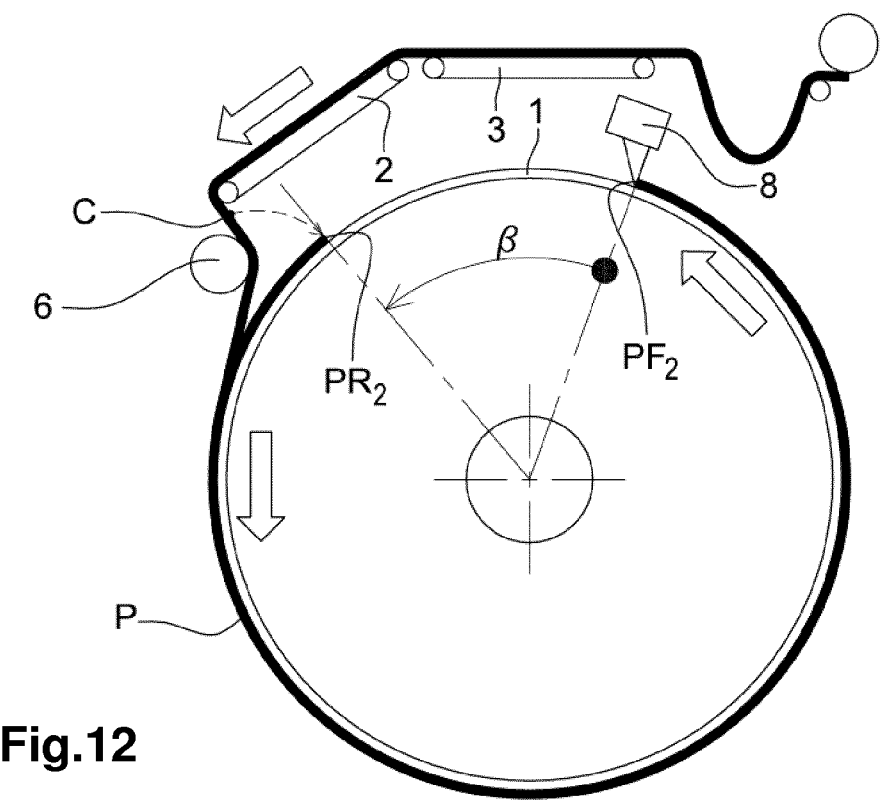
FIGS. 12 and 13 represent schematic profile views of the front edge detection device.
Figure 13:
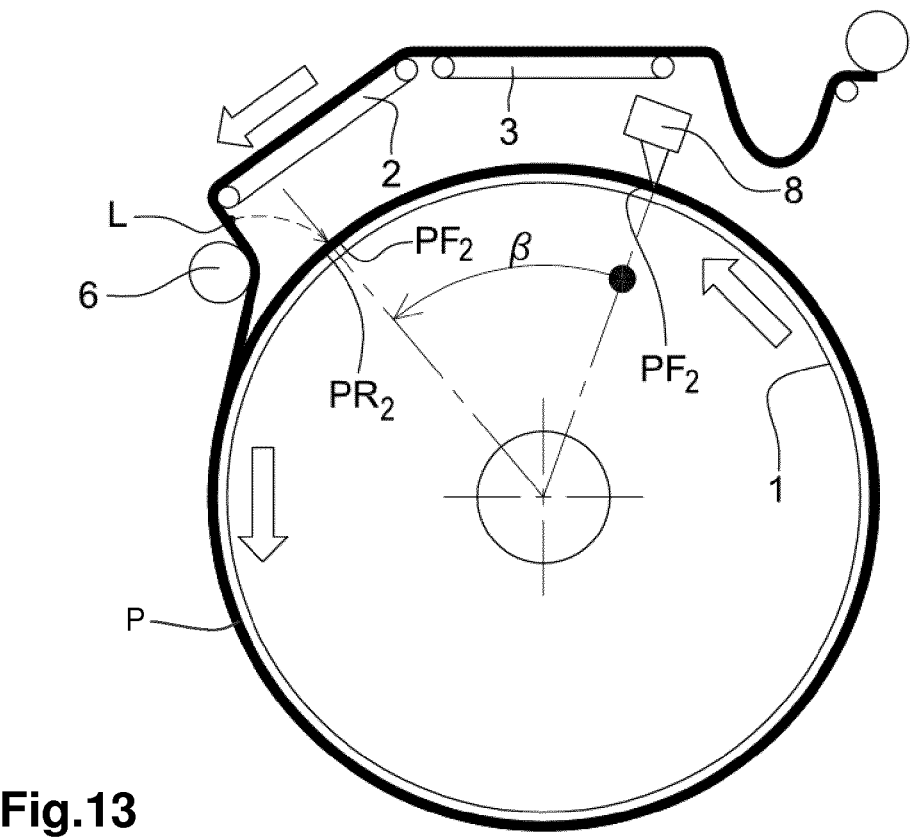

A second alternative consists in activating a device 8 for automatically detecting the front edge illustrated in FIGS. 12 and 13.

This device is disposed above the cylindrical form upstream of the meeting point between the ply P and the surface of the cylindrical form 1. For greater accuracy, the device 8 is disposed at the equatorial line of the cylindrical form on which the ply and the centres $PF_2$ and $PR_2$ of the front and rear edges are centred.

The edge detection device 8 comprises a sensor sensitive to the height variation created on the cylindrical form 1 by the passage of said front edge PF in line with said edge detection device 8. To this end, a range-finding laser or even a mechanical wiper can be used. Once the passage of the edge is detected, as is illustrated in FIG. 12, the cylindrical form automatically performs an angular rotation by a predetermined angle β so as to position the front edge in line with an imaginary line corresponding to the line joining the front edge PF and the rear edge PR as is illustrated in FIG. 13.

The rotation of the cylindrical form 1 is then stopped.

When the cylindrical form 1 is formed by the assembly of segments separated by empty spaces, the edge detection device 8 can generate detections wrongly. Arrangements are then made, during the step A, to position the cylindrical form in such a way that the front edge at the central part is disposed on a predetermined segment. The azimuth of this segment can usefully form part of the prescription stored in the centralized control unit.

The step C, during which the cutting blade is made to penetrate into the ply P, can then be executed.

According to the first alternative, the cutting blade 513 penetrates directly into the mark M added by the operator and previously registered by the camera 510.

According to the second alternative, the cutting blade is brought to a predetermined transverse position such that the cutting blade 513 penetrates into the ply P at a point situated on the cutting line L. By turning down the rear part of the ply on the cylindrical form 1, the front edge PF and the rear edge PR can then be joined, as is illustrated in FIG. 13. Preferentially, the cutting blade 513 and the sensor 8 are placed on the same equatorial plane.

It will be seen here that the step C can proceed without the intervention of the operator.

The cutting operation itself, which makes it possible to detach the ply P from the band, is then executed automatically as follows.

During a step D, the cylindrical form is made to revolve in the second circumferential direction, opposite the first circumferential direction, while displacing the cutting blade 513 between the two wires of the wire gap in a first transverse direction until the cutting blade is disposed at a predetermined and non-zero distance from the second selvedge L2. As soon as a cell 511 detects the presence of the selvedge, the centralized control unit stops the rotation of the cylindrical form. This non-zero distance is of the order of 1 cm to 2 cm and makes it possible to avoid having the cutting blade leave the wire gap in which it is held.

During the step E, while keeping the cutting blade 513 in the wire gap, the cylindrical form 1 is made to rotate in the first circumferential direction, while displacing the cutting blade in a second transverse direction opposite the first transverse direction, until the cutting blade 513 emerges at the first selvedge L1. The cutting blade 513 can be raised, and the cutting head is returned to a waiting transverse position.

It will be observed that the cutting of the ply is done by going from the heel $PR_3$ of the rear edge to the point $PR_1$ of the rear edge. This preferred cutting direction makes it possible to reduce the deformation of the ply and to favour the joining of the two edges.

During this step E, the intervention of the operator is not necessary.

In the step F, the cylindrical form is made to rotate in the second circumferential direction and the rear edge PR is made to adhere on the cylindrical form 1 by abutting the rear edge PR and the front edge PF. This operation is performed by the operator, who adjusts the joining of the two edges. The reinforcing band is progressively rewound on the winding device 7. However, the efforts linked to the detachment of the product, which are necessary to ensure the joining of the edges, are greatly alleviated by the movement of the different drive mats 2, 3 and 4, which drive the reinforcing band P towards the winding device 7 without it being necessary to involve the operator.

Finally, in the step G, using manual tools, the operator completes the separation of the reinforcing ply from the rest of the band by cutting, using a manual tool, the gum bridge situated at the second selvedge L2 over the few centimetres which had been left as is at the end of the step D, and detaches the rear edge PR to complete the joining the rear edge PR and of the front edge PF.

To perfect the laying of the ply, it is then possible, when necessary, to activate roll-stitching means that make it possible to promote the adhesion of the ply on the ply laid previously.

Thus, while implementing devices that are for the most part known per se, the method according to the present disclosure makes it possible to improve the accuracy of laying of a product such as a crown reinforcing ply and to relieve the operator of the physical efforts linked to the operations of alignment, of cutting and of positioning of the ply, in particular when laying products intended for the production of civil engineering tires of large dimension.

PARTS LIST

1 Cylindrical form.
10 Motor.
2 Laying mat.
21 Drive roller upstream of the laying mat.
3 Centring mat.
30 Axis of rotation of the alignment mat.
31 Cameras for viewing the selvedges disposed between the centring mat and the laying mat.
32 Centring mat actuation cylinder.
4 Supply mat.
5 Cutting device.
50 Transverse rail for the circulation of the cutting head.
51 Cutting head.
510 Camera registering the mark disposed on the body of the cutting head.
511 Cells for registering the selvedges disposed on the body of the cutting head.
512 Body of the cutting device.
513 Cutting blade.
514 Spherical point.
515 Support arm.
516 Laser sensor/means for evaluating the transverse position of the cutting blade relative to the cutting device.
52 Reflector.
6 Dynamometric roller for regulating laying tension.
7 Motorized winding and unwinding device.
8 Front edge detection device.
a Angle of the wires with the longitudinal direction.
P Wire ply.
PF Front edge.
$PF_1$ Front edge point.
$PF_2$ Front edge centre.
$PF_3$ Front edge heel.
PR Rear edge.
$PR_1$ Rear edge point.
$PR_2$ Rear edge centre.
$PR_3$ Rear edge heel.
W Reinforcing wires.
$L_1$ First selvedge.
$L_2$ Second selvedge.
L Cutting line.
M Mark/point of penetration.
XX' Longitudinal axis/circumferential direction.
YY' Transverse axis.
ZZ' Axis at right angles to the plane of the ply/radial axis.
d Free travel of the cutting blade in the transverse direction within predetermined limits.
r Radius of the drive roller upstream of the laying mat.

What is claimed is:

1. A method for laying, on a rotationally driven cylindrical form, a reinforcing ply composed of wires coated in a rubber mixture, parallel to one another and forming a given angle with the longitudinal direction of the ply, comprising steps during which:

Step A: a front edge of the reinforcing ply is made to adhere to the cylindrical form, and, by rotating the cylindrical form in a first circumferential direction, the reinforcing ply is deposited on the cylindrical form until the front edge performs a complete revolution, Step B: a point of penetration on a cutting line is determined on the ply to form a rear edge intended to be joined with the front edge, Step C: a cutting blade with which a cutting head that is translationally driven along a transverse axis is equipped, is made to penetrate, between two wires that are placed on the cutting line at said point of penetration and that define a wire gap, Step D: the cylindrical form is made to rotate in a second circumferential direction, opposite the first circumferential direction, while displacing the cutting head in a first transverse direction until the cutting blade is disposed at a predetermined and non-zero distance from a second selvedge and, without retracting the cutting blade from the wire gap, Step E: the cylindrical form is made to rotate in the first circumferential direction, while displacing the cutting head in a second transverse direction, opposite the first transverse direction, until the cutting blade emerges at a first selvedge, Step F: the cylindrical form is made to rotate in the second circumferential direction and the rear edge is made to adhere on the cylindrical form by abutting the rear edge and the front edge, Step G: the rear edge of the ply is detached at the second selvedge and the joining of the rear edge and of the front edge is completed.

2. The method according to claim 1, wherein, during the step B, an operator determines the point of penetration and adds a visible mark at that point.

3. The method according to claim 2, wherein, during the step C, using a camera disposed on the cutting head, the mark disposed on the point of penetration is detected, and the rotation of the cylindrical form and the transverse displacement of the cutting head are controlled to bring said cutting blade in line with said point of penetration.

4. The method according to claim 1, wherein, during the step B, the front edge is detected using an edge detection device sensitive to the height variation created on the cylindrical form by the passage of said front edge in line with said edge detection device, and the cylindrical form and the cutting blade are brought to predetermined angular and transverse positions so that, during the step C, the cutting blade penetrates between two wires at the point of penetration situated on the cutting line.

5. The method according to claim 4, wherein the transverse position of the cutting blade is aligned with the position of the edge detection device.

6. The method according to claim 5, wherein the edge detection device is disposed transversely equidistant from the first selvedge and from the second selvedge.

7. The method according to claim 1, wherein, during the steps D and E, the transverse displacement of the cutting head is regulated as a function of the longitudinal displacement of a laying mat and of the angle formed by the wires with the longitudinal direction.

8. The method according to claim 7, wherein the cutting blade is freely mobile in a transverse direction relative to the cutting head.

9. The method according to claim 8, wherein, using a means for evaluating the transverse position of the cutting blade relative to the cutting head, the transverse displacement of the cutting head is adjusted so that the transverse position of the cutting blade relative to the cutting head remains within predetermined limits.

10. The method according to claim 1, wherein, during the steps A, D, E and F, the reinforcing ply is made to circulate in succession on a centring mat and on a laying mat which are disposed upstream of the cylindrical form.

11. The method according to claim 10, wherein the centring mat is rotationally mobile about an axis at right angles to the plane of the centring mat on which the ply circulates and in which, using cameras detecting the position of the selvedges of the ply, the angular position of the centring mat is regulated so as to align the ply with a predefined transverse position.

12. The method according to claim 11, wherein the wires (W) of the ply are metal wires, and wherein the centring mat and the laying mat are provided with a magnetic device to make the ply adhere to said mats.

13. The method according to claim 10, wherein the planes of the laying mat and of the centring mat, on which the ply circulates, form between them a non-zero angle.

14. The method according to claim 13, wherein a motive force imparted on the ply by the centring mat is less than or equal to half a motive force imparted on the ply by the laying mat.

15. The method according to claim 10, wherein the longitudinal speed of the laying mat and of the centring mat, relative to the speed of rotation of the cylindrical form, is adjusted so that the tension of laying of the ply on the cylindrical form is equal to a predetermined value.

16. The method according to claim 1, wherein, in the step G, the rear edge of the ply is detached using manual tools.

17. The method according to claim 1, wherein the cylindrical form is formed by radially mobile segments.

18. The method according to claim 1, wherein the cylindrical form is the crown of a toroidal tire blank.

* * * * *